(12) United States Patent
Yeh et al.

(10) Patent No.: US 11,848,628 B2
(45) Date of Patent: Dec. 19, 2023

(54) FLEXIBLE CLEAN ENERGY POWER GENERATION DEVICE WITH HIGH POWER GENERATION EFFICIENCY

(71) Applicant: NATIONAL TAIWAN UNIVERSITY OF SCIENCE AND TECHNOLOGY, Taipei (TW)

(72) Inventors: Li-Hsien Yeh, Taipei (TW); Mengyao Gao, Taipei (TW); Jie-Yu Yang, Taipei (TW)

(73) Assignee: NATIONAL TAIWAN UNIVERSITY OF SCIENCE AND TECHNOLOGY, Taipei (TW)

( * ) Notice: Subject to any disclaimer, the term of this patent is extended or adjusted under 35 U.S.C. 154(b) by 365 days.

(21) Appl. No.: 17/411,074

(22) Filed: Aug. 25, 2021

(65) Prior Publication Data
US 2023/0069772 A1  Mar. 2, 2023

(51) Int. Cl.
*H02N 99/00*  (2006.01)

(52) U.S. Cl.
CPC .................................. *H02N 99/00* (2013.01)

(58) Field of Classification Search
CPC ....... H02N 11/002; H02N 99/00; Y02E 60/50
See application file for complete search history.

(56) References Cited

U.S. PATENT DOCUMENTS

| 2007/0231648 A1* | 10/2007 | Han | H01M 8/1023 |
| | | | 429/535 |
| 2019/0097257 A1* | 3/2019 | Dutta | H01M 8/04186 |
| 2020/0041450 A1* | 2/2020 | Yeh | G01N 27/44791 |

* cited by examiner

*Primary Examiner* — Naishadh N Desai
(74) *Attorney, Agent, or Firm* — Fei-Hung Yang

(57) ABSTRACT

A flexible clean energy power generation device with high power efficiency, which is a multi-film structure, includes an internal conductive support layer and an ion transport layer. The internal conductive support layer is formed by coating a conductive material onto a hydrophilic substrate; the ion transport layer is formed by coating a polyelectrolyte onto an outer side of the internal conductive support layer. After a solution is dropped on the device, the solution produces a capillary pressure difference by capillary action and evaporation phenomena to drive water molecules and counterions of the solution to move from a wet side to a dry side, thus producing a potential difference. Without an external pressure, the device uses a layered two-dimensional conductive material together with a polyelectrolyte, realizing a self-electrokinetic power generation with high energy output and long-life by capillary action and evaporation phenomena with using pure aqueous solution or other electrolyte solutions.

10 Claims, 25 Drawing Sheets

G/PSS/G

GPSS

: G

: Cation

: PSS

FLEXIBLE CLEAN ENERGY POWER GENERATION DEVICE WITH HIGH POWER GENERATION EFFICIENCY

BACKGROUND

Technical Field

The present invention generally relates to the technical field of electrokinetic power generation. More particularly, the present invention relates to a flexible clean energy power generation device with high power generation efficiency, which uses capillary action and evaporation to drive water and ions to move and generate electric power in a two-dimensional material and a polyelectrolyte layer, so as to enhance the voltage, current and power generation time for an efficient clean energy output.

Description of Related Art

Energy crisis and environmental pollution are difficult issues facing the world today. To achieve sustainable development, clean energy devices developed without emitting any organic pollutants during the power generation process has received extensive attention from international research teams in recent years. In particular, the electric clean energy conversion device that makes use of the electrokinetic effect to combine with the nanochannel is considered as an important potential feasible solution for the implementation of clean energy strategy due to the simple structure of the device that fills the nanochannel with an aqueous solution or a water-based electrolyte solution, and then uses the pressure difference to drive the movement of water and ions in the nanochannel and generate the "streaming current and streaming potential".

When the solid-liquid interface at a nanochannel surface is at an equilibrium state, electric double layers (EDLs) with a high concentration of counterions will be formed, and this interfacial phenomenon will affect the power generation efficiency of the related electric clean energy power generation devices.

In other words, when the nanochannel surface carries an electric charge, it will attract counterions and repel coions in an aqueous solution, so as to form the EDLs. In the EDLs, the concentration of counterions is higher than the concentration of coions, and the EDLs have a high free ion concentration, so that if there is a pressure difference between both ends of the channel, more counterions will gather at the downstream of the channel, which will cause a difference between the upstream and downstream potentials of the channel and result in a steaming potential or a streaming current. The ion concentration difference between the counterions and coions in the nanochannel (which is the free ion concentration) will affect the overall output potential and current efficiency of the electric clean energy conversion device. And when this device is connected to an external load, it can output electric energy to achieve the effect of converting electrokinetic energy into electrical energy.

In short, the conversion of electric clean energy uses the electrokinetic phenomena to generate a potential difference for energy storage and application, and the way of effectively converting the pressure gradient in the system into electrical energy has also become the key to the improvement of the performance of related devices. In addition, previous studies indicated that traditional electric clean energy generation efficiency is greatly affected by the parameters such as the electric charge and geometric shape of a nanochannel surface, the aqueous solution properties (pH value, and electrolyte concentration), and the velocity distribution in the channel. But no matter how the parameter changes, the system needs to apply external pressure with mechanical energy, so that the poor energy conversion efficiency is always a long-existing problem, which limits the development of related systems in practical applications.

As disclosed in U.S. Pat. No. 2019/0097257, a power generation method by using the electrokinetic conversion uses an external pressure difference to drive the movement of water and ions in nanochannels to generate system energy. Although this method can improve the traditional electric clean energy power generation efficiency, the method has the following three disadvantages which limit the commercialization of the method. (1) Most traditional electrokinetic power generation devices require a mechanical pump to apply external pressure difference (that is, to input mechanical energy to the device). As a result, even if this method can use the evaporation and capillary action to enhance the electrokinetic energy output, the energy conversion efficiency is still very low (below 4.2%), and the output energy is also very small (about $10^{-10}$ W), which cannot drive the operation of any electronic product at all. (2) The design of the microfluidic device is complex and usually requires the use of soft lithography or laser engraving technology to prepare the microfluidic channel, which is expensive and will also limit the commercial application of this device and method. (3) This device does not have flexibility and will significantly limit the practical applications.

In view of the aforementioned problems, it is a main subject for this invention to develop a cheap, easy and flexible clean energy power generation device capable of extending the power generation time, increasing the output voltage and current, and greatly increasing the output performance of the related electric clean energy conversion devices, and such device can be used in small appliances and wearable devices or low-grade energy electronic products in the future.

SUMMARY

Therefore, it is a primary objective of the present invention to provide a flexible clean energy power generation device with high power generation efficiency, and the device has the advantages of simple manufacture, low cost, and high-efficiency energy output and uses a conductive material together with a polyelectrolyte layer having the property of spatial electric charges to provide the function of a quick ion transport channel, and further uses the self-power generation effect created by the capillary pressure and evaporation to achieve high voltage, high current, and long-lasting output efficiency and clean energy in pure water or other electrolyte solutions and improve the power generation efficiency.

To achieve the aforementioned and other objectives, the present invention discloses a flexible clean energy power generation device with high power generation efficiency, being a multi-film structure, and comprising: an internal conductive support layer, formed by a hydrophilic substrate coated with a conductive material; and an ion transport layer, formed by coating a polyelectrolyte on an outer side of the internal conductive support layer; thereby, after a solution is dropped on the flexible clean energy power generation device, the solution produces a capillary pressure difference by the capillary effect and evaporation phenomena to drive water molecules and counterions of the solution to move from a wet side to a dry side, so as to produce a potential difference. Therefore, when no external pressure is applied, the device can provide high voltage, high current and long-lasting output stably to effectively overcome the long-existing problem of a low energy conversion efficiency of the electric clean energy conversion. At the same time, the device has the advantages of simple manufacture, low material cost, eco-friendliness and greatly reduced production cost, which is very suitable for the sustainable development of renewable energy applications.

Preferably, in another implementation mode, the flexible clean energy power generation device further comprises an external electron transport layer formed by coating a conductive material onto an outer side of the ion transport layer. Wherein, the external electron transport layer and the internal conductive support layer form a nanochannel, and the ion transport layer at the middle forms a high-speed ion channel. Therefore, the power generation efficiency can be improved further. The internal conductive support layer and the external electron transport layer disposed inside and outside the polyelectrolyte respectively can play the role of conducting electrons in circuit and achieve the effects of stabilizing the ion transport layer, reducing the system flow resistance, and preventing a quick evaporation of the solution, so as to extend the power output.

Preferably, in a further implementation mode, the conductive material is two-dimensional graphene, MXene or zero-dimensional carbon black, and has the advantages of low material cost and excellent conductivity.

Preferably, in another implementation mode, the polyelectrolyte is poly(sodium-p-styrenesulfonate) (PSS) or poly-L-lysine (PLL), so that the water and ions have a better mobile state to further improve the power generation efficiency.

Preferably, in another implementation mode, when the polyelectrolyte is poly(sodium-p-styrenesulfonate), the ion transport layer is formed by attaching a polyelectrolyte solution onto the internal conductive support layer and drying the layer, wherein the weight percentage of poly(sodium-p-styrenesulfonate) in the polyelectrolyte solution is 20~29 wt %, and thus the device so formed has an optimal output efficiency.

In summation of the description above, the flexible clean energy power generation device with high power generation efficiency in accordance with the present invention plays an important role of the ion channel by using the conductive material and the polyelectrolyte to provide a quick movement of water and ions in the channel, in the polyelectrolyte, or inside/outside the conductive material. Besides the role of conducting electrons, the device also plays the role of stabilizing the ion transport layer and reducing the system flow resistance. Furthermore, the outer-layer two-dimensional conductive material can prevent the aqueous solution in the system from being evaporated too quickly, so as to achieve the long-term power generation. In the present invention, only a very small amount of pure water or water-based electrolyte solution is used in the overall power generation process, and no chemical pollutant is produced in the power generation process, so that the invention provides a very clean energy generation device, and has the advantages of high flexibility and easy manufacture, and does not require any expensive materials such as the precious metal. Moreover, the invention is eco-friendly and capable of greatly reducing the manufacturing cost, which is beneficial to sustainable application development of renewable energy.

DESCRIPTION OF THE EMBODIMENTS

The accompanying drawings are included to provide a further understanding of the invention, and are incorporated in and constitute a part of this specification. The drawings illustrate embodiments of the invention and, together with the description, serve to explain the principles of the invention.

Figure 1:
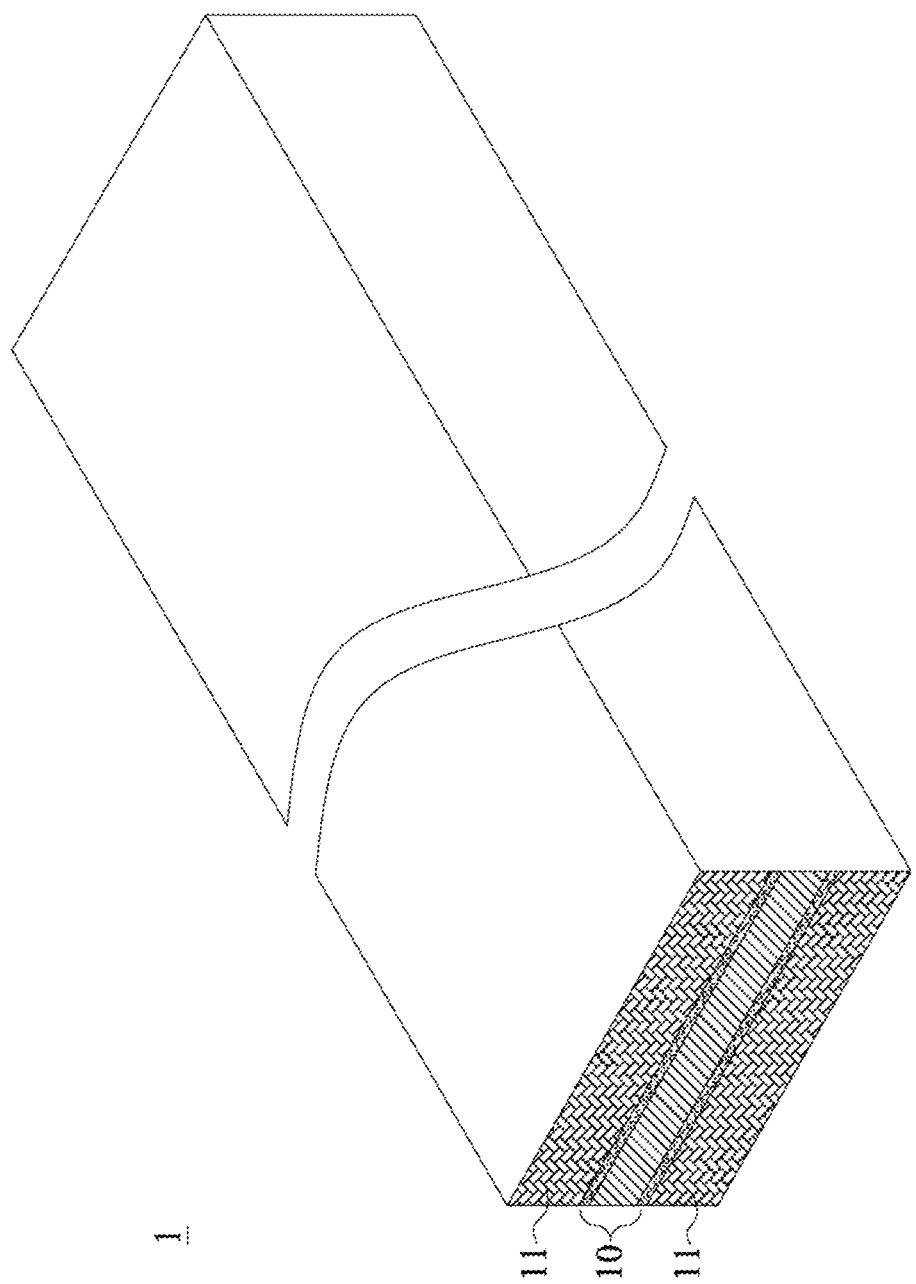
FIG. 1 is a schematic view of a flexible clean energy power generation device in accordance with a preferred embodiment of the present invention.

With reference to FIG. 1 for the schematic view of a flexible clean energy power generation device in accordance with a preferred embodiment of the present invention, the structure drawn in the figure does not represent the actual thickness, length, width, or scale in order to help readers to clearly understand the technical characteristics of the present invention. In fact, the flexible clean energy power generation device of the present invention is a film structure. The present invention provides a flexible clean energy power generation device with high power generation efficiency 1, which is a multi-film structure, comprising an internal conductive support layer 10 and an ion transport layer 11. The internal conductive support layer 10 is formed by coating a hydrophilic substrate onto a two-dimensional conductive material, and the hydrophilic substrate can be a cellulose paper or a fabric, and a conductive material is coated on the peripheral side of the hydrophilic substrate to form the internal conductive support layer 10. The ion transport layer 11 is formed by coating a polyelectrolyte (with a strong spatial electric charge property) onto an outer side of the internal conductive support layer 10 to achieve an overlapping effect of the EDLs and a quick ion transport. After a solution 2 is dropped on the flexible clean energy power generation device 1, the solution 2 produces a capillary pressure difference by the capillary effect and evaporation phenomena to drive water molecules and a large quantity of counterions in the flexible clean energy power generation device 1 to move from a wet end towards a dry end, so as to form different upstream and downstream potentials of the flexible clean energy power generation device 1 and produce a potential difference. After the external electronic instrument is electrically connected, the electronic instrument will be operated. Specifically, the present invention adds the ion transport layer 11 which is a polyelectrolyte and uses the high overlapping effect of the EDLs brought by the ion transport layer 11 to achieve the effects of moving the water molecules and counterions quickly to produce the potential difference without the need of applying an additional pressure, and the device of the invention has the advantage of high power output.

Figure 2:
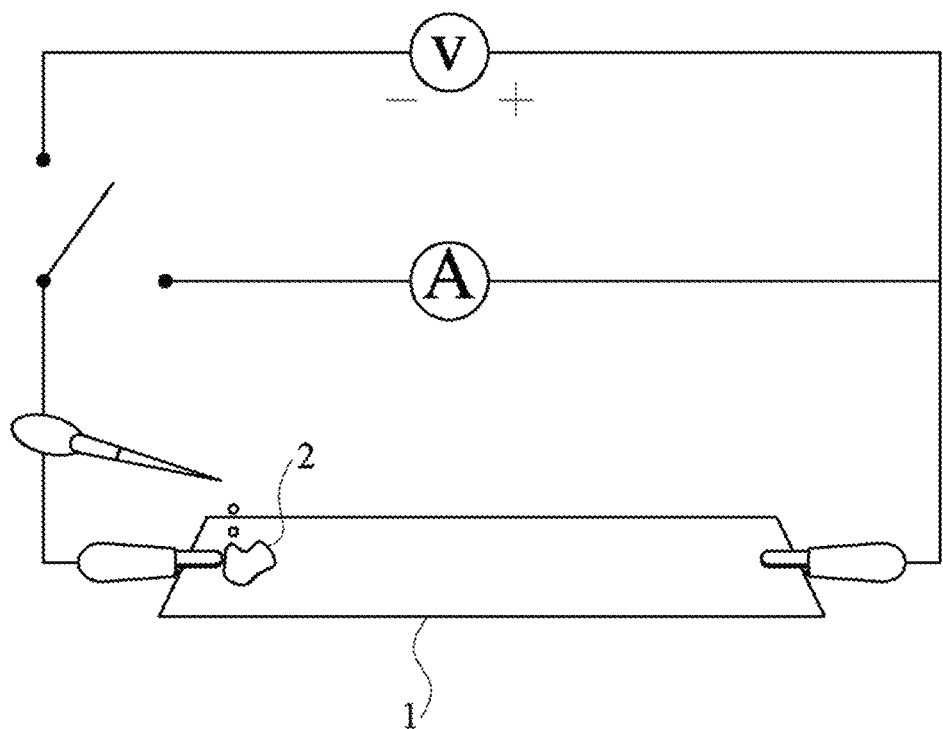
FIG. 2 is a schematic view of an application of a flexible clean energy power generation device in accordance with a preferred embodiment of the present invention.

With reference to FIG. 2 for a specific application of a flexible clean energy power generation device in accordance with a preferred embodiment of the present invention, after the device drops a small amount of the solution 2 on a side of the flexible clean energy power generation device 1, the capillary effect and evaporation phenomena form a capillary pressure difference to drive water molecules and a large quantity of counterions to move from a wet side to a dry side of the flexible clean energy power generation device 1, so as to produce different upstream and downstream potentials of the device and form a potential difference, which generates electric energy to drive an external electronic instrument. Wherein, the solution 2 is not limited to the type and concentration of the electrolyte, and it can be pure water solution or any other electrolyte solutions, and just a small amount of the solution 2 (0.3 mL) is required to achieve unprecedented high voltage, high current and long-lasting output which will be described later.

Figure 3:
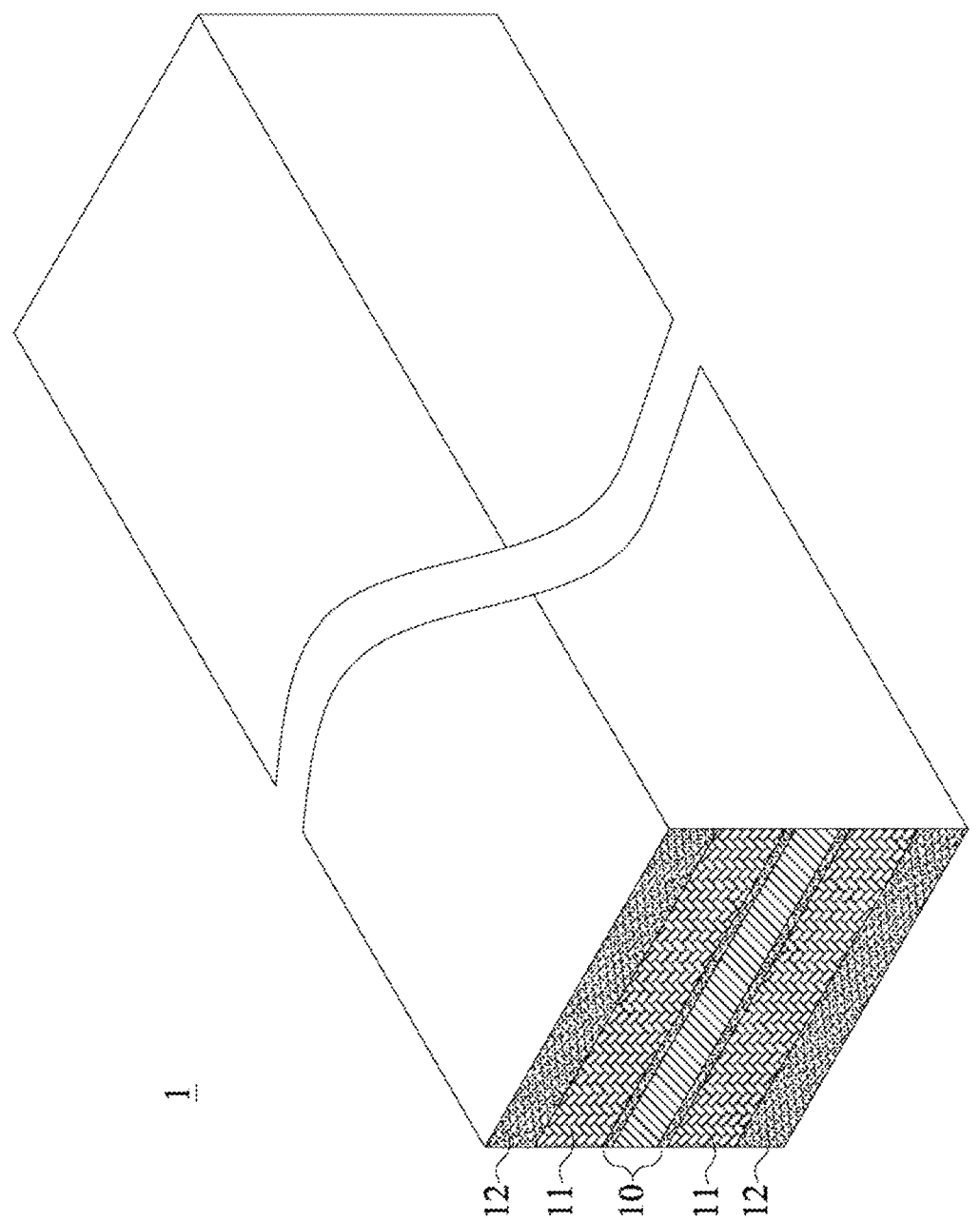
FIG. 3 is a schematic view of a flexible clean energy power generation device in accordance with another preferred embodiment of the present invention.
Figure 4A:
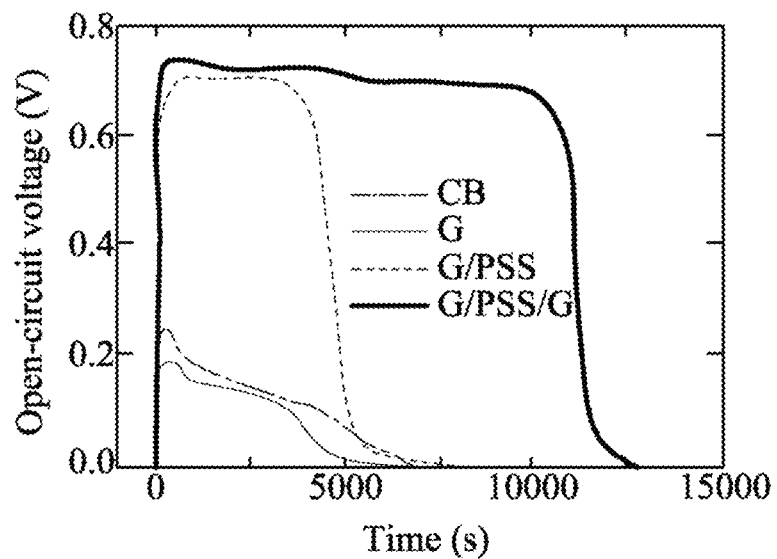
FIG. 4A is a statistical diagram showing the change of experiment data of the open-circuit voltage outputted by various films of different structures and materials.
Figure 4B:
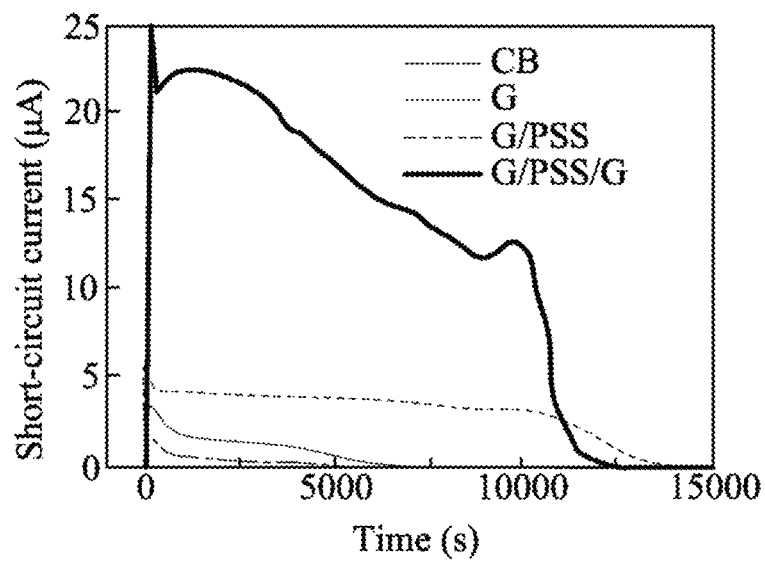
FIG. 4B is a statistical diagram showing the change of experiment data of the short-circuit current outputted by various films of different structures and materials.
Figure 4C:
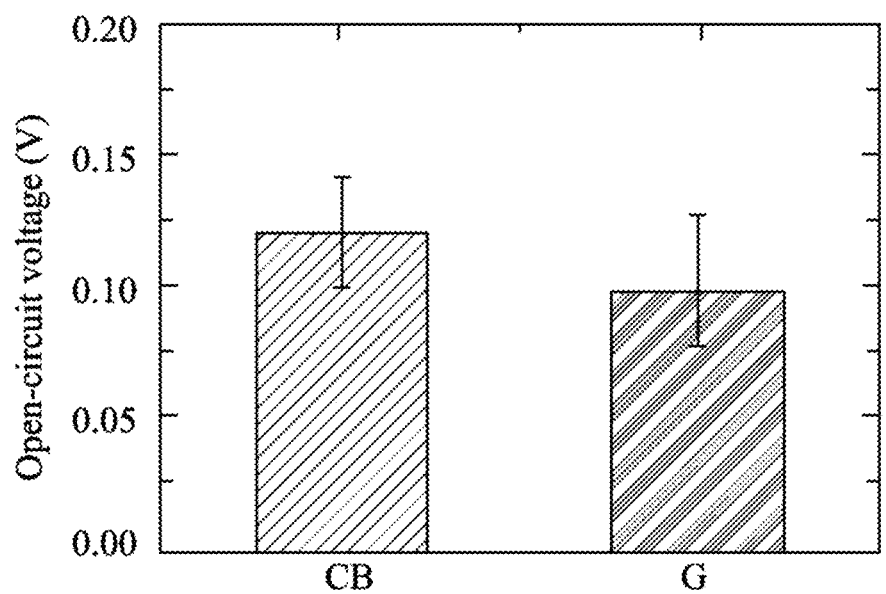
FIG. 4C is a statistical diagram showing the data of the open-circuit voltage outputted by a single-layer two-dimensional conductive graphene film and a single-layer zero-dimensional conductive carbon black particle film.
Figure 4D:
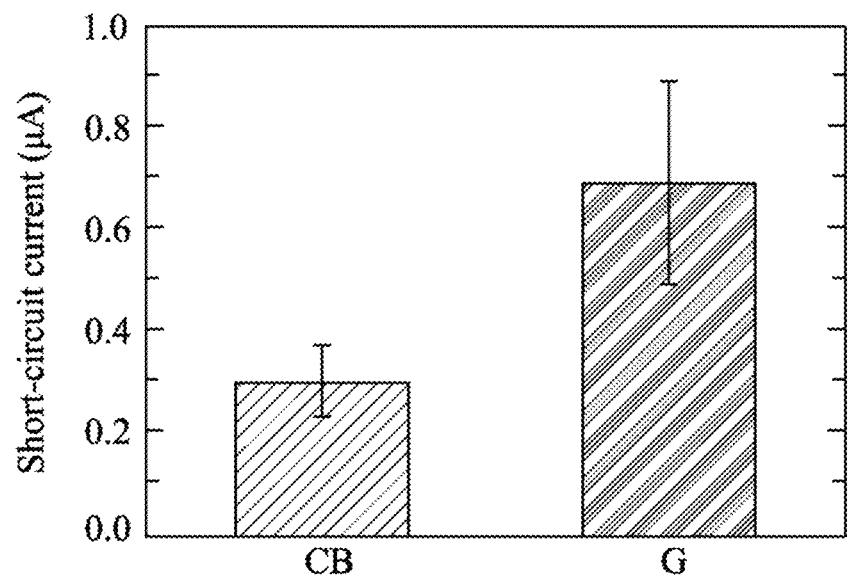
FIG. 4D is a statistical diagram showing the data of the short-circuit current outputted by a single-layer two-dimensional conductive graphene film and a single-layer zero-dimensional conductive carbon black particle film.
Figure 4E:
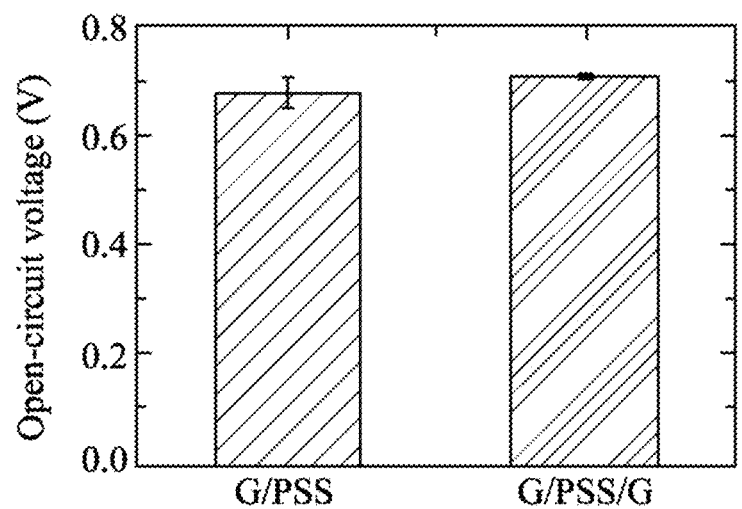
FIG. 4E is a statistical diagram showing the data of the open-circuit voltage outputted by the orderly layered films in accordance with a preferred embodiment and another preferred embodiment of the present invention.
Figure 4F:
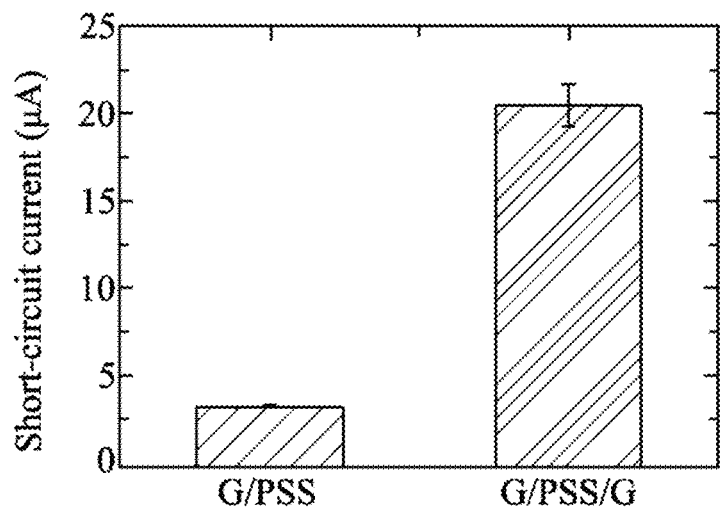
FIG. 4F is a statistical diagram showing the data of the short-circuit current outputted by the orderly layered films in accordance with a preferred embodiment and another preferred embodiment of the present invention.

With reference to FIG. 3 for a schematic view of a flexible clean energy power generation device in accordance with another preferred embodiment of the present invention, same as FIG. 1, the structure drawn in the figure does not represent the actual thickness, length, width, or scale in order to help readers to clearly understand the technical characteristics of the present invention. In fact, the flexible clean energy power generation device of the present invention is a film structure. The flexible clean energy power generation device 1 of the present invention further comprises an external electron transport layer 12 formed by coating a conductive material on an outer side of the ion transport layer 11, wherein the external electron transport layer 12 and the internal conductive support layer 10 form a nanochannel, and the ion transport layer 11 at the middle form a high-speed ion channel. In this embodiment, the flexible clean energy power generation device 1 is an orderly multi-layer structure, and after the external electron transport layer 12 is added to the exterior of the ion transport layer 11, the external electron transport layer 12 disposed at the outermost layer together with the internal conductive support layer 10 cover the ion transport layer 11 to form a nanochannel with a spatial electric charge property, so as to provide a significant overlapping effect of the electric double layers and the function of the ion channel for a quick ion transport, and such layer can serve as a "ceiling" to achieve the effects of protecting and reduce water from being evaporated too quickly, so as to effectively extend the power generation time.

Furthermore, the difficulty of obtaining and preparing materials, and the cost of materials are taken into account, and the conductive material used in the structure of the flexible clean energy power generation device 1 can be two-dimensional graphene (G), MXene or zero-dimensional carbon black (CB), and the polyelectrolyte can be a negatively charged polymer material with space charges, such as Poly(sodium-p-styrenesulfonate) (poly(sodium 4-styrenesulfonate), PSS), or a positively charged polymer material with space charges, such as poly-L-lysine (PLL).

Different related experiment data conducted by the team of the present invention on the flexible clean energy power generation device 1 provided below, and these experiments show that the flexible clean energy power generation device 1 of this invention does have novel structural features different from those of the existing technology, and the invention also shows excellent power generation efficiency and time-efficiency. In practical applications, the invention can also achieve the function of generating electricity through a small amount of solution without generating any chemical pollutants in the process, and it has excellent application performance in wild environments or emergency situations, and can eliminate adverse effects on the natural environment.

With reference to FIGS. 4A-4B, 4C-4D and 4E-4F for the graphs showing the change of experiment data of the open-circuit voltage (OCV) and the short-circuit current (SCC) outputted by film structures of different structures and materials, and the graphs of the statistical data of the OCV and the SCC of a single-layer two-dimensional conductive graphene film and a single-layer zero-dimensional conductive carbon black particle film, respectively, the G/PSS/G is used to describe the content of the flexible clean energy power generation device 1 of the present invention with an orderly layered film structure having the external electron transport layer 12, the internal conductive support layer 10 and the ion transport layer 11, and G/PSS is used to describe an orderly layered film structure of the present invention having the internal conductive support layer 10 and the ion transport layer 11; and G is used to describe a traditional film formed by a single-layer two-dimensional conductive graphene film, and CB is used to described a traditional film formed by single-layer zero-dimensional conductive carbon black particles, wherein G stands for the film formed by a single-layer two-dimensional conductive graphene film, and CB for the film formed by traditional single-layer zero-dimensional conductive carbon black particles.

The contents shown in FIGS. 4A to 4F aim to study the power generation efficiency of a film power generation device with different number of layers or different conductive materials. In general, under the open circuit condition, current cannot pass through the system, so that the OCV outputted by the device can be measured. On the other hand, under the short circuit condition, the SCC outputted by the device can be measured, and the values of the OCV and SCC represent the output efficiency of the related power generation device. Experiment results show that the flexible clean energy power generation device 1 (G/PSS) having the internal conductive support layer 10 and the ion transport layer 11, and the flexible clean energy power generation device 1 (G/PSS/G) further having the external electron transport layer 12 have a power generation efficiency much higher than those of the G film and the CB film, clearly verifying that the conductive material together with the polyelectrolyte can indeed form an ion transport channel with an easy transport feature. Besides providing a fast ion transport path and enhancing the output values of OCV and SCC, the external electron transport layer 12 of this embodiment also has the effect of protecting moisture and preventing loss of water caused by excessive evaporation, hereby greatly extending the power generation time. For example, the double-layer G/PSS film of the present invention can at most output an OCV of approximately 0.7 V. Compared to the single-layer CB film and G film, the double-layer G/PSS film has a better power generation efficiency. As to the SCC, this film also has a better efficiency than that of the single-layer CB film or G film. Preferably, the G/PSS/G film can at most output an OCV of approximately 0.7 V, an SCC of approximately 20 µA, and a power generation time over 10000 seconds, and these numerical values are much greater than those of the CB film and the G film. Compared with the CB film, the OCV is increased by nearly six times, the SCC is increased by nearly 70 times, and the power generation time is increased by nearly one time.

The main reason of the above results is that in the film structure composed of solid single-layer materials such as carbon black and cellulose paper, most of the counterions carrying oppositely charged ions are concentrated on the wall of the solid charged nanochannel. Since the solid channel surface has a limited amount of electric charges, the concentration of free ions in the channel is limited, and thus the overall clean electric energy output efficiency of the device is also limited, and the experiment data of FIGS. 4A and 4B have verified this result. Obviously, the flexible clean energy power generation device 1 of the present invention has the advantage of maintaining long-term output of high voltage and high current, and the multi-layered film structure combining the conductive material and the polyelectrolyte has a better power generation efficiency than that of the single-layer two-dimensional conductive film G and single-layer zero-dimensional conductive carbon black particle film CB.

Figure 5A:
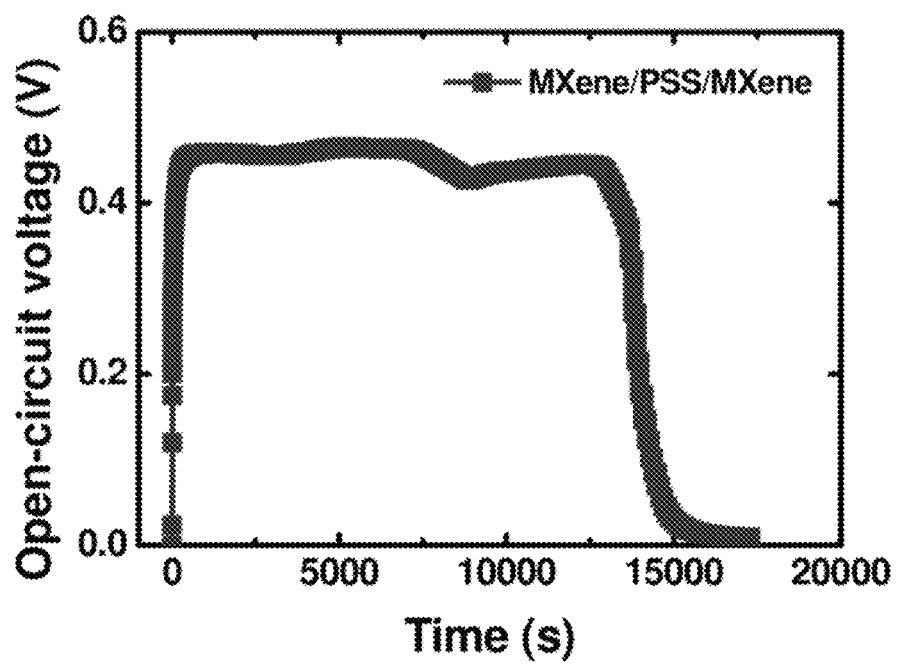
FIG. 5A is a graph showing the change of experiment data of the open-circuit voltage outputted by an orderly layered film made of a two-dimensional conductive MXene material in accordance with another preferred embodiment of the present invention.
Figure 5B:
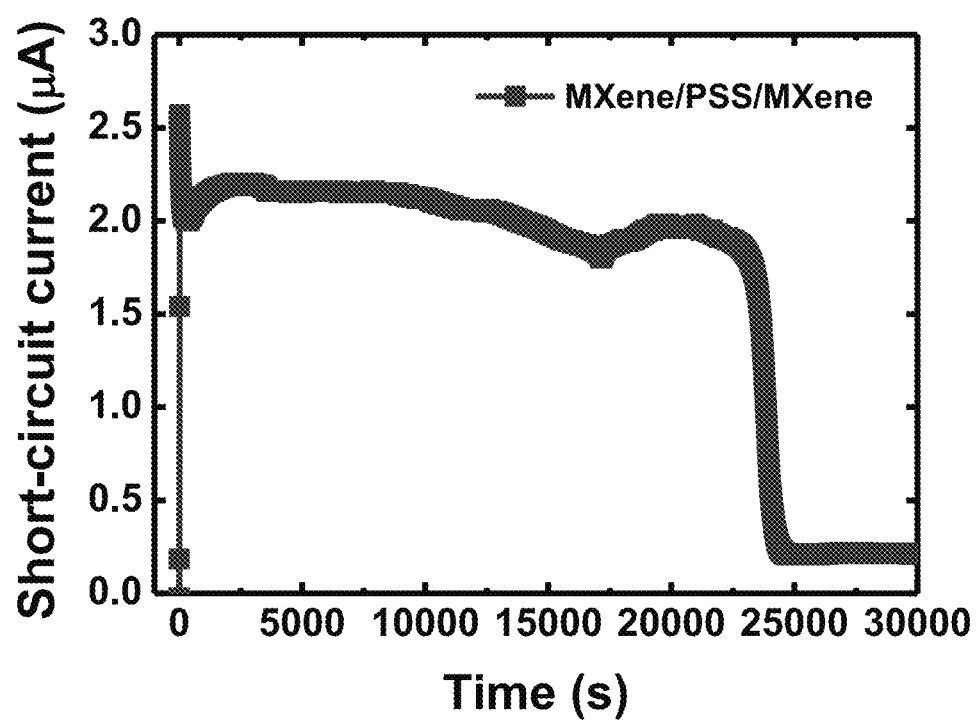
FIG. 5B is a graph showing the change of experiment data of the short-circuit current outputted by an orderly layered film made of a two-dimensional conductive MXene material in accordance with another preferred embodiment of the present invention.

As to the two-dimensional conductive material, the team of the present invention also studied the applicability of two-dimensional conductive materials other than graphene. With reference to FIGS. 5A and 5B for the graphs showing the change of experiment data of the OCV and the SCC outputted by an orderly layered film made of a two-dimensional conductive MXene material in accordance with another preferred embodiment of the present invention, respectively, the MXene/PSS/MXene is an orderly layered film structure of the flexible clean energy power generation device 1 of the present invention having the external electron transport layer 12, the internal conductive support layer 10 and the ion transport layer 11, and experimental results show that when the two-dimensional MXene conductive material is selected as the material for the external electron transport layer 12 and the internal conductive support layer 10, the flexible clean energy power generation device 1 can still operate smoothly. Referring to FIGS. 4A and 4B again, the structure of this embodiment of the invention still maintains the excellent power generation efficiency, compared with the single-layer CB film and G film devices.

In addition to the experiment conducted for the two-dimensional conductive material, the team of the present invention also studied the feasibility of using the zero-dimensional conductive material under the multi-layer structure of the present invention.

Figure 6A:
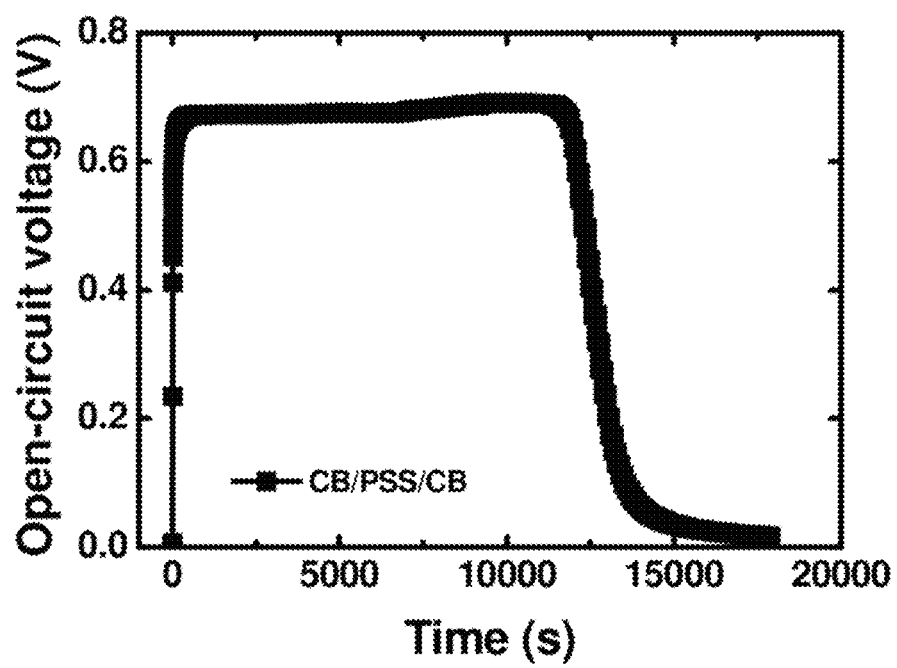
FIG. 6A is a graph showing the change of experiment data of the open-circuit voltage outputted by an orderly layered film made of a zero-dimensional conductive carbon black particle material in accordance with another preferred embodiment of the present invention.
Figure 6B:
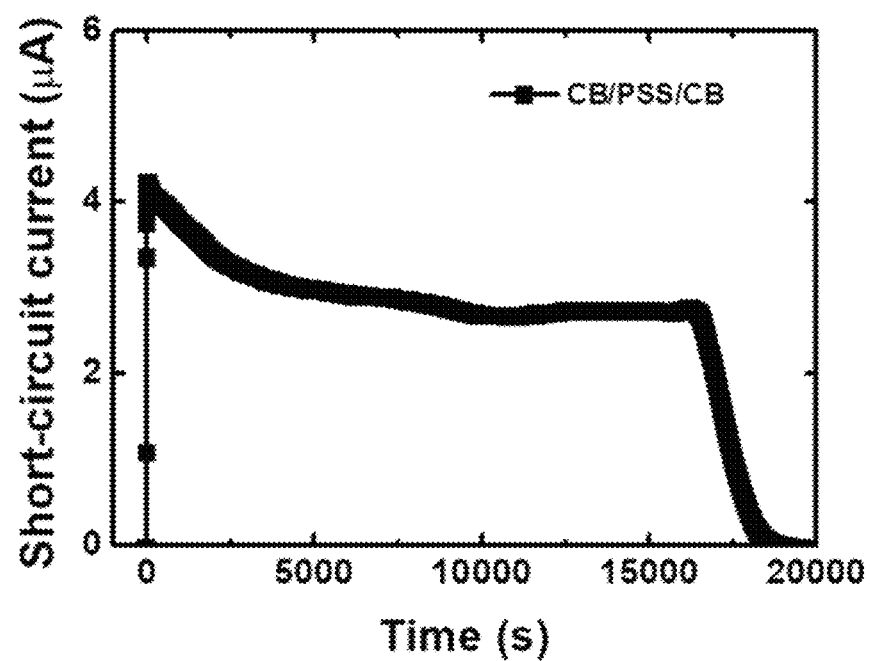
FIG. 6B is a graph showing the change of experiment data of the short-circuit current outputted by an orderly layered film made of a zero-dimensional conductive carbon black particle material in accordance with another preferred embodiment of the present invention.

With reference to FIGS. 6A and 6B for the graphs showing the change of experiment data of the OCV and the SCC outputted by an orderly layered film made of a zero-dimensional conductive material in accordance with another preferred embodiment of the present invention, respectively, the CB/PSS/CB is orderly layered film of the flexible clean energy power generation device 1 of the present invention having the external electron transport layer 12, the internal conductive support layer 10 and the ion transport layer 11. Experiment data show that after the conductive material is replaced by the zero-dimensional carbon black, the flexible clean energy power generation device 1 still has excellent operation efficiency and electric energy output. Referring to FIGS. 4A and 4B again, the structure of this embodiment of the present invention still maintains the excellent power generation efficiency compared to the single-layer CB film and G film device, and thus showing that even the zero-dimensional conductive material can solve the problem of poor power generation efficiency through the multi-layered film structure of the present invention, and achieve the high-efficiency power output efficiency.

Figure 7A:
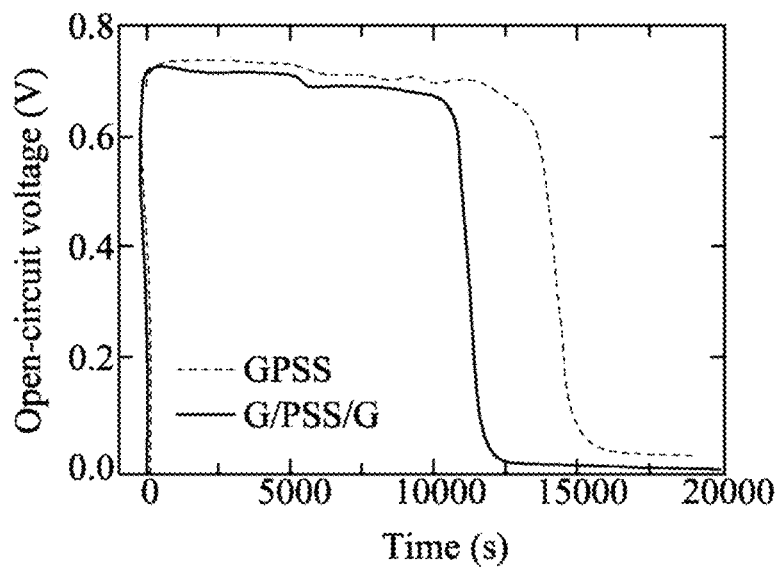
FIG. 7A is a graph comparing the change of experiment data of the open-circuit voltage of an orderly layered film structure and a disorderly layered film structure in accordance with the present invention.
Figure 7B:
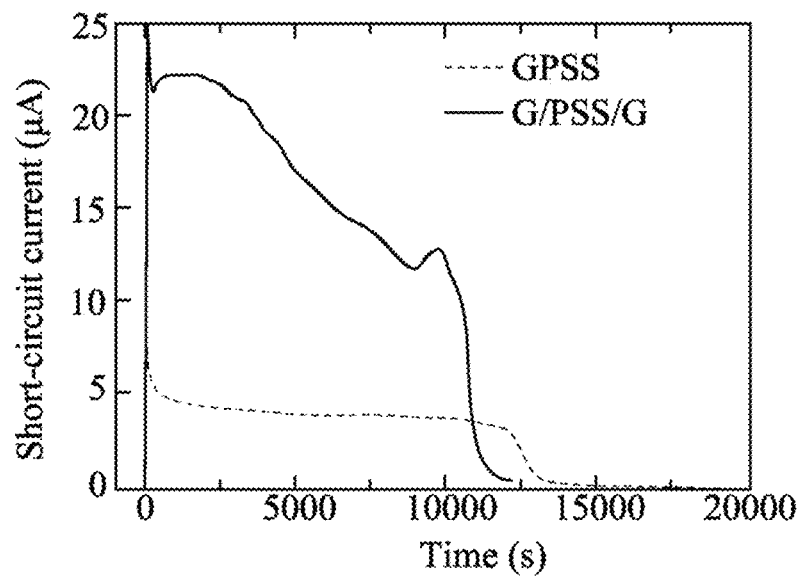
FIG. 7B is a graph comparing the change of experiment data of the short-circuit current of an orderly layered film structure and a disorderly layered film structure in accordance with the present invention.
Figure 7C:
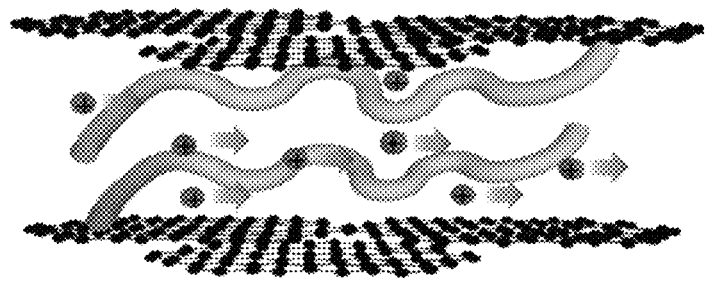
FIG. 7C is a schematic view showing the ion transport behaviour of an orderly layered film structure and a disorderly layered film structure in accordance with the present invention.
Figure 7C:
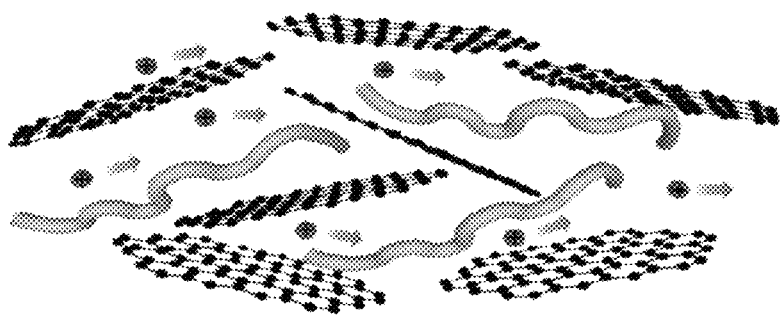
Figure 8A:
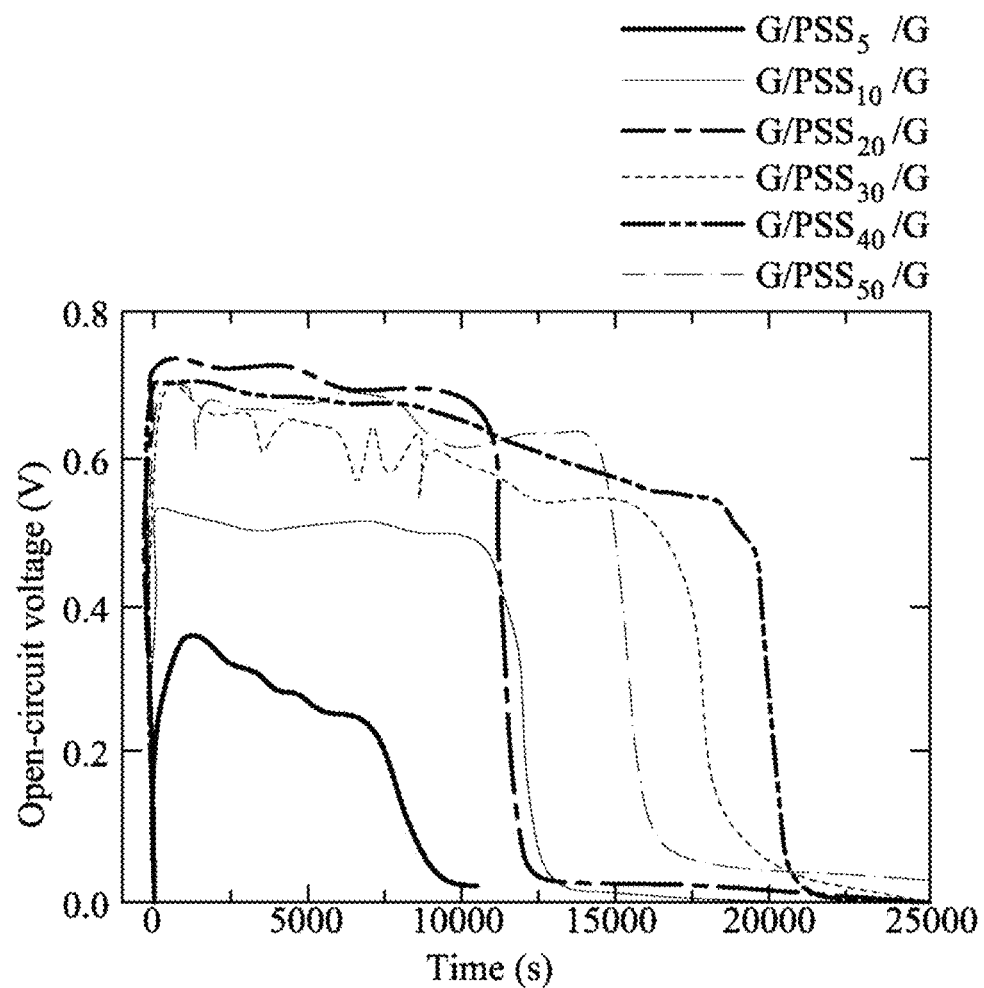
FIG. 8A is a graph showing the change of experiment data of the open-circuit voltage outputted by the flexible clean energy power generation devices composed of poly(sodium-p-styrenesulfonate) (PSS) polyelectrolytes of different weight percentages.
Figure 8B:
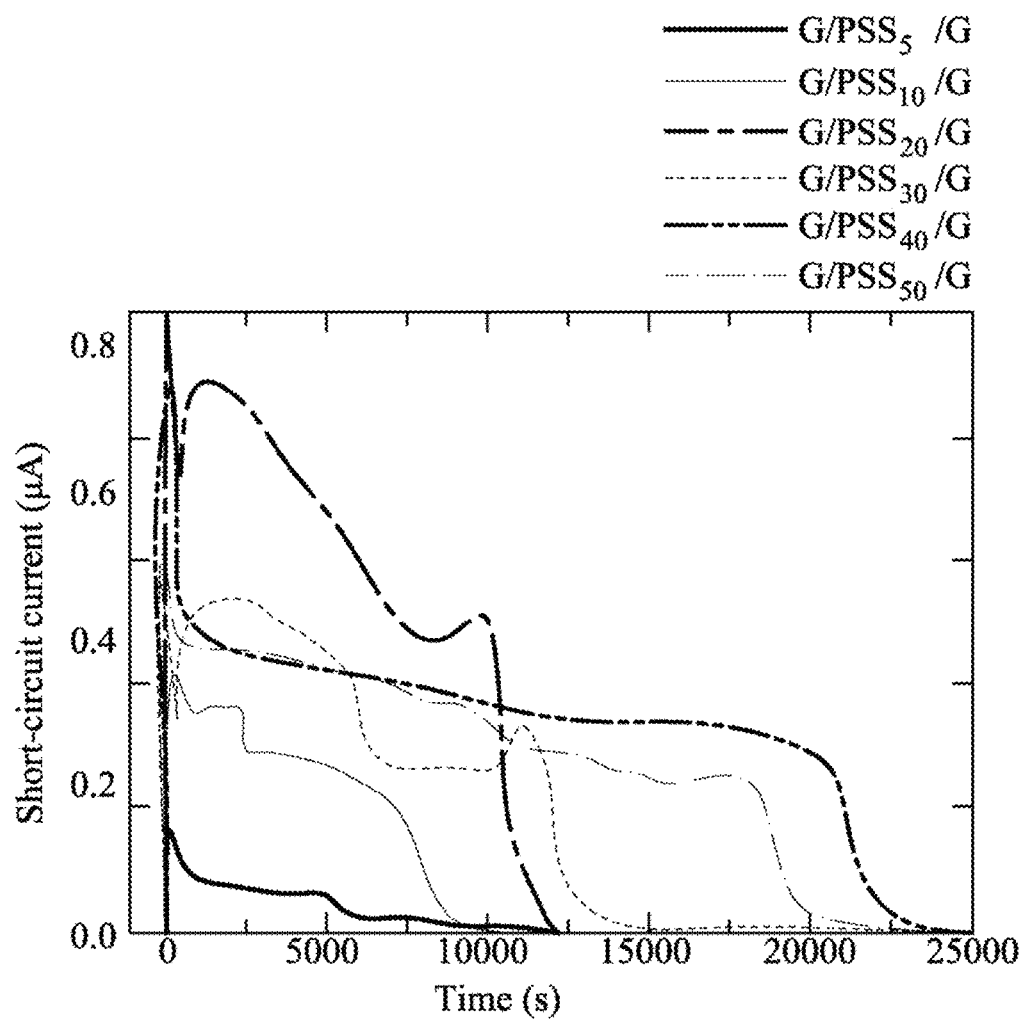
FIG. 8B is a graph showing the change of experiment data of the short-circuit current outputted by the flexible clean energy power generation devices composed of poly(sodium-p-styrenesulfonate) (PSS) polyelectrolytes of different weight percentages.
Figure 8C:
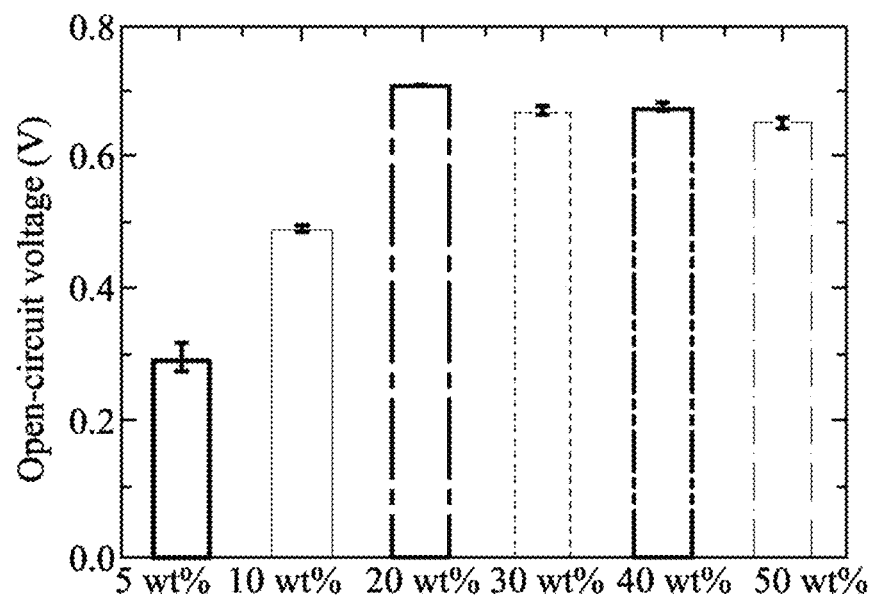
FIG. 8C is a statistical diagram showing the change of experiment data of the open-circuit voltage outputted by the flexible clean energy power generation devices composed of poly(sodium-p-styrenesulfonate) (PSS) polyelectrolytes of different weight percentages.
Figure 8D:
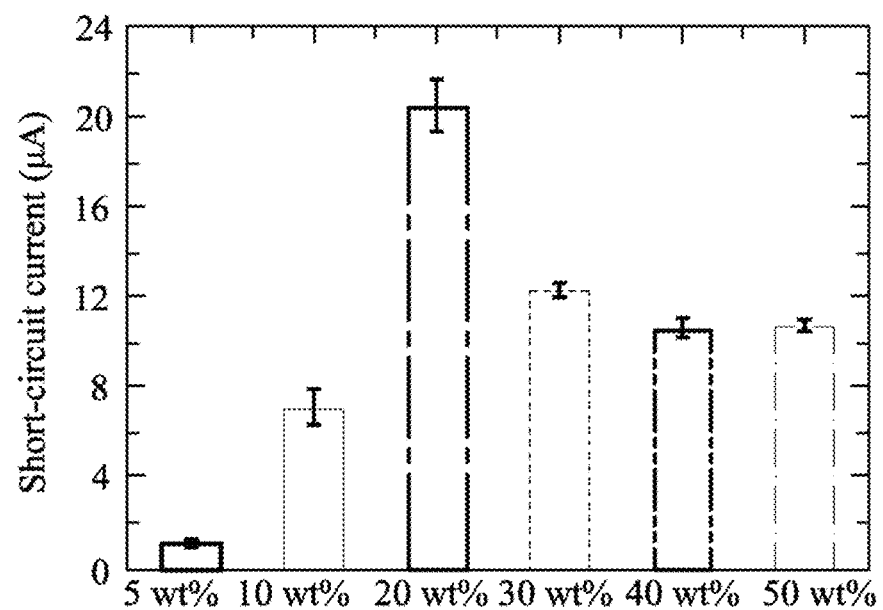
FIG. 8D is a statistical diagram showing the change of experiment data of the short-circuit current outputted by the flexible clean energy power generation devices composed of poly(sodium-p-styrenesulfonate) (P S S) polyelectrolytes of different weight percentages.

With reference to FIGS. 7A, 7B and 7C for the graphs comparing the change of experiment data of the OCV and the SCC of an orderly layered film structure and a disorderly layered film structure in accordance with the present invention, and the schematic view showing the ion transport behaviour of an orderly layered film structure and a disorderly layered film structure in accordance with the present invention, respectively, the team of the present invention studied the impact of the orderly layered G/PSS/G film and the disorderly distributed film GPSS composed of the two-dimensional conductive graphene and polyelectrolyte on the power generation efficiency of the related electric clean energy devices. In FIGS. 7A and 7B, experimental data clearly show that although the output OCVs of the two (G/PSS/G and GPSS) are close, the former (G/PSS/G film) has a SCC output four times higher than that of the later (GPSS film). The reason for such a big difference between the current outputs of the two films resides on their structural arrangements (please refer to FIG. 5C for the ordered structural arrangement of the G/PSS/G film), and thus the ion transport resistance can be reduced, and the system current can be increased. On the other hand, the two-dimensional conductive material in the GPSS film is disorderly distributed, and the disordered distribution may hinder the transmission of ions, increase the ion transport resistance, and decrease the system current. Therefore, the ordered arrangement can indeed provide a better ion transport effect, which allows the SCC output to be improved drastically.

With reference to FIGS. 8A to 8D for the graph showing the change of experiment data of the OCV and the SCC outputted by the flexible clean energy power generation devices composed of poly(sodium-p-styrenesulfonate) (PSS) polyelectrolytes of different weight percentages and the graphs of experiment data of the OCV and the SCC, respectively, the flexible clean energy power generation device 1 having the external electron transport layer 12, the ion transport layer 11 and the internal conductive support layer 10 is used as an example, and the polyelectrolyte is PSS. In other words, while the G/PSS/G film was used, the team of the present invention continued to study the impact of polyelectrolyte PSS content on the overall power generation efficiency. When the polyelectrolyte is poly(sodium-p-styrenesulfonate) (PSS), the ion transport layer 11 is formed by attaching the polyelectrolyte solution onto the internal conductive support layer 10 and then dried for formation. Now, the initial weight percentage of the polyelectrolyte solution will affect the power generation efficiency of the flexible clean energy power generation device 1. The team of the present invention conduct experiments on the polyelectrolyte solutions with different initial weight percentages, and experiment data showed that the OCV outputted by the G/PSS/G film with a tendency below 20 wt % will increase with the weight percentage. If the weight percentage of the PSS film exceeds 20 wt %, the G/PSS/G film will show an output OCV value of 0.60.7 V. The SSC value outputted by the G/PSS/G film with a tendency below 20 wt % will also increase with the weight percentage, but if the weight percentage of the PSS film exceeds 20 wt %, the maximum SCC value outputted by the G/PSS/G film will drop from the value larger than 20 µA to a value below 12 µA, and it shows that a high content of polyelectrolyte PSS will slightly reduce the OCV of the system, and the molecular chain will also hinder the ion transport and reduce the SCC output of the system. Preferably, when the polyelectrolyte is selected as poly(sodium-p-styrenesulfonate)(PSS), the initial weight percentage of the polyelectrolyte solution is 2029 wt %, and the flexible clean energy power generation device 1 will have a better power generation efficiency, and the preferred weight percentage is 20 wt %.

Figure 9:
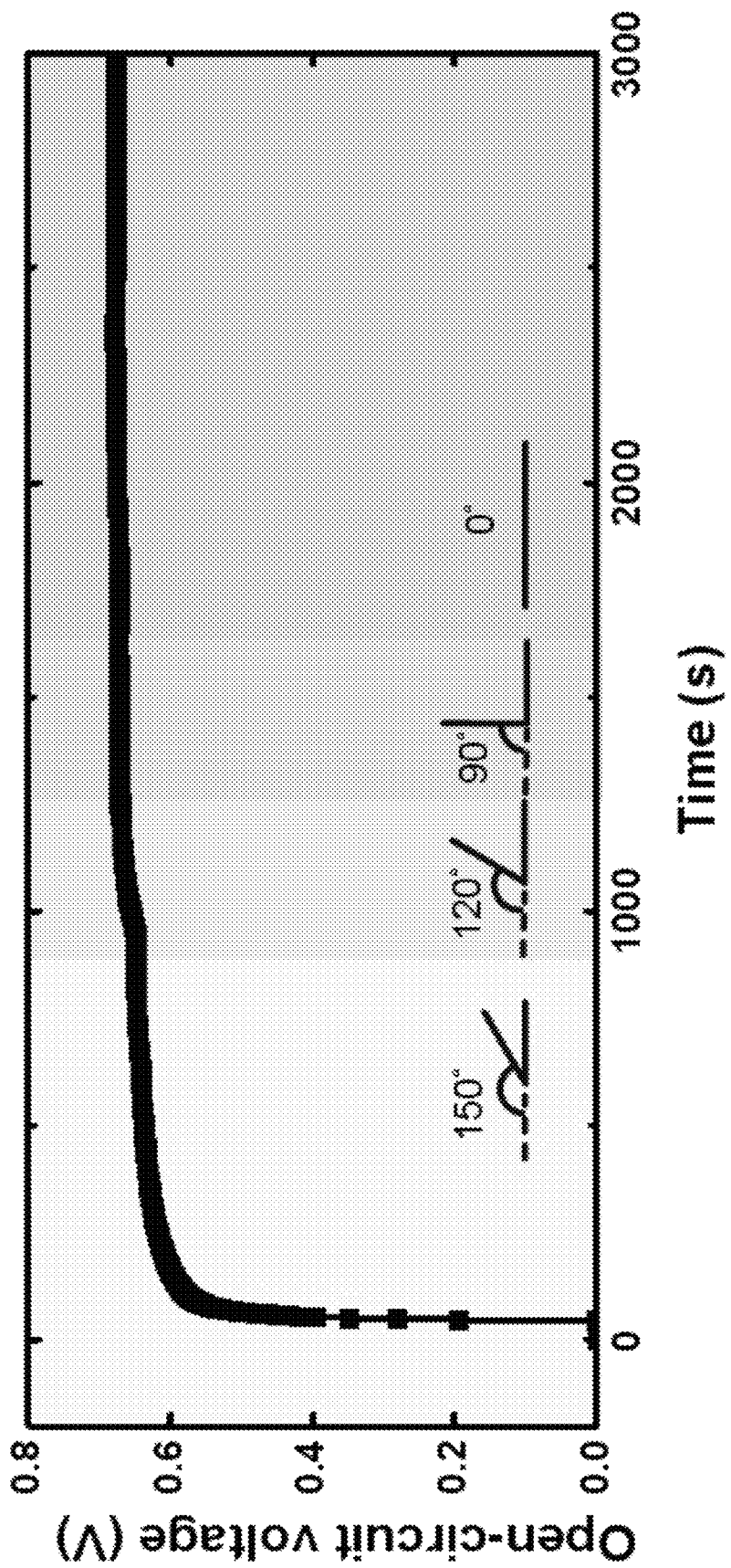
FIG. 9 is a graph showing the change of experiment data of the open-circuit voltage outputted by a flexible clean energy power generation device at different bending angle in accordance with another preferred embodiment of the present invention.

The team of the present invention further conducted a flexibility test for the G/PSS/G film. With reference to FIG. 9 for the graph showing the change of experiment data of the OCV outputted by a flexible clean energy power generation device of the present invention at different bending angles, the G/PSS/G film is folded and bent by 150 degrees first, and now, the G/PSS/G film can still stably output the OCV exceeding 0.6 V, and then the folding and bending angles are reduced to 120 degrees and 90 degrees, and the OCV output of the G/PSS/G film still maintains a stable and slight increase. Finally, the folding and bending angle of the G/PSS/G film was restored to the normal state of 0 degrees which is the flat state as shown in FIG. 2, and it was found that the OCV was also restored to a stable output of nearly 0.7 V, indicating that the flexible clean energy power generation device 1 can greatly improve the electric clean energy power generation efficiency of the system and maintain an overall consistent power generation efficiency of the system at a bending angle between 0° and 150°, and there will be no short circuits. Obviously, this device has a high potential to be used in related wearable electronic products in the future.

Figure 10A:
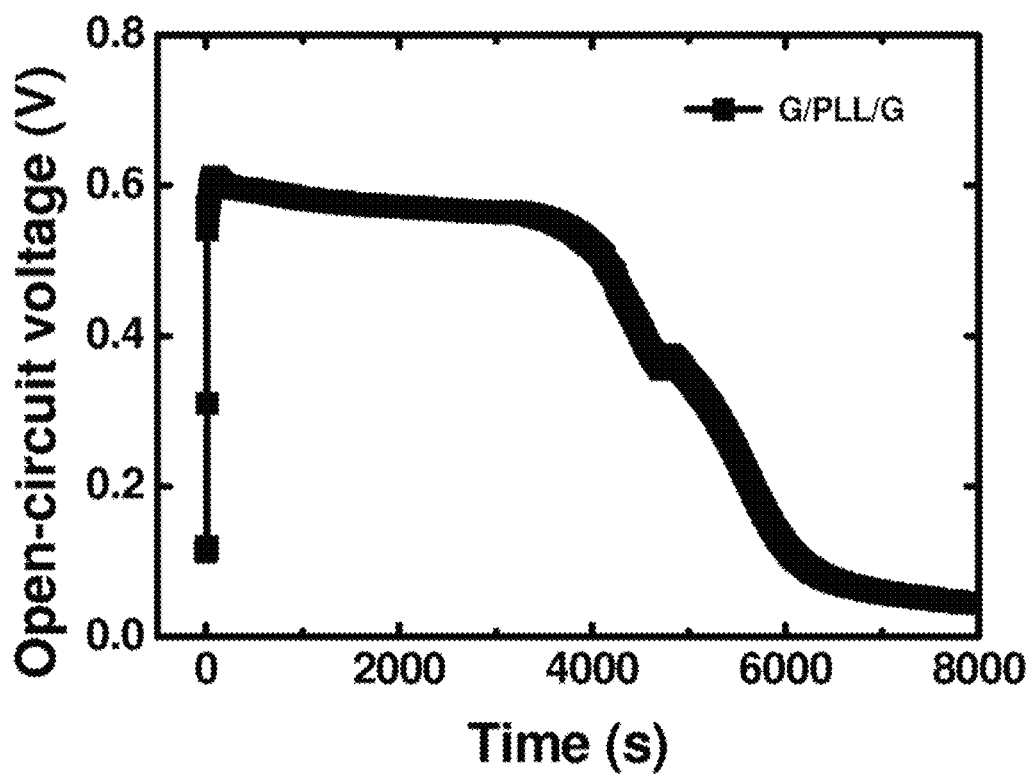
FIG. 10A is a graph showing the change of experiment data of the open-circuit voltage outputted by a flexible clean energy power generation device when positively charged poly-L-lysine is used as the material of an ion transport layer in accordance with another preferred embodiment of the present invention.
Figure 10B:
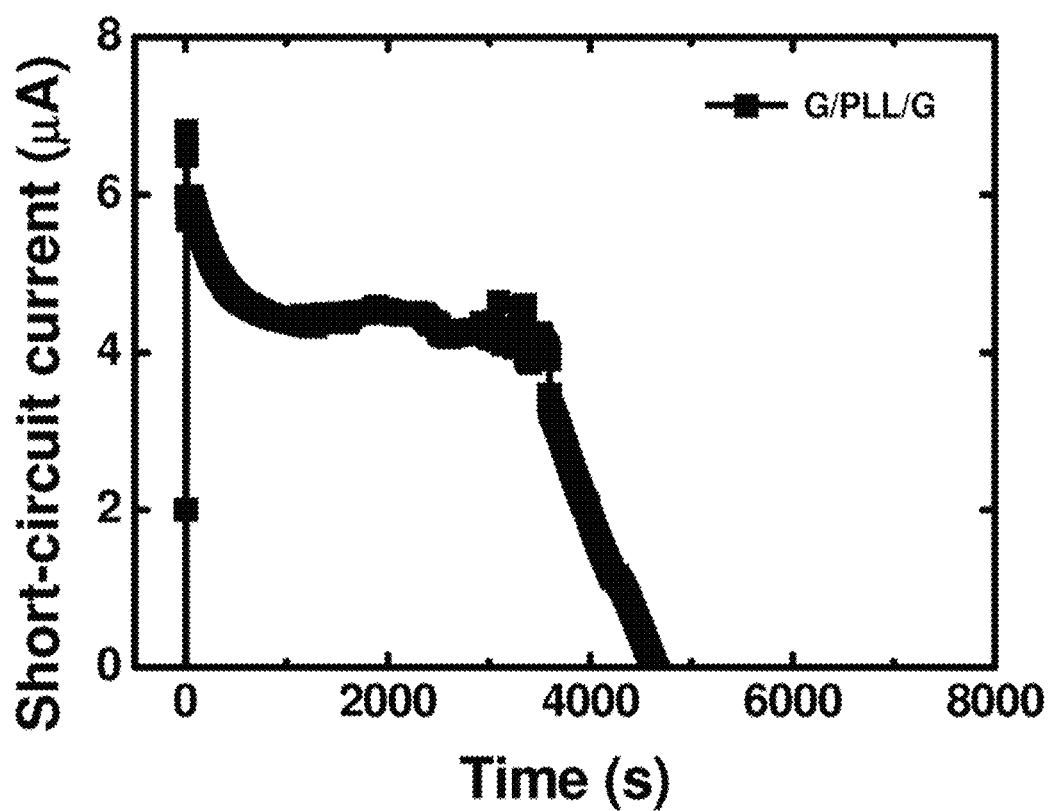
FIG. 10B is a graph showing the change of experiment data of the short-circuit current outputted by a flexible clean energy power generation device when positively charged poly-L-lysine is used as the material of an ion transport layer in accordance with another preferred embodiment of the present invention.

On the other hand, the team of the present invention also studied the impact of using the poly-L-lysine (PLL) carrying positive spatial electric charges other than the material of the PSS carrying negative spatial electric charges as the ion transport layer 11 on the electric clean energy power generation efficiency of the flexible clean energy power generation device 1. With reference to FIGS. 10A and 10B for the graphs showing the change of experiment data of the OCV and the SCC outputted by a flexible clean energy power generation device when positively charged PLL is used as the material of an ion transport layer in accordance with another preferred embodiment of the present invention respectively, the experiment data show that even the polyelectrolyte material is replaced with the PLL carrying the positive spatial electric charges, and the overall power generation efficiency is lower than G/PSS/G, the flexible clean energy power generation device 1 can still operate smoothly, while maintaining the excellent power generation efficiency.

Figure 11A:
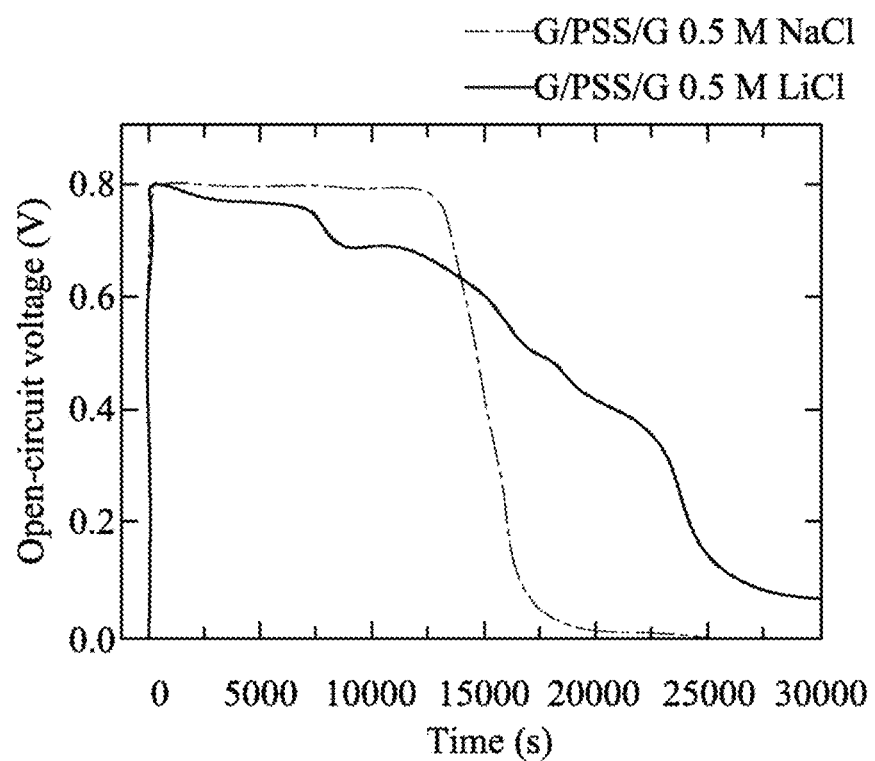
FIG. 11A is a graph showing the change of experiment data of the open-circuit voltage outputted by a flexible clean energy power generation device when another electrolyte aqueous solution is used in accordance with another preferred embodiment of the present invention.
Figure 11B:
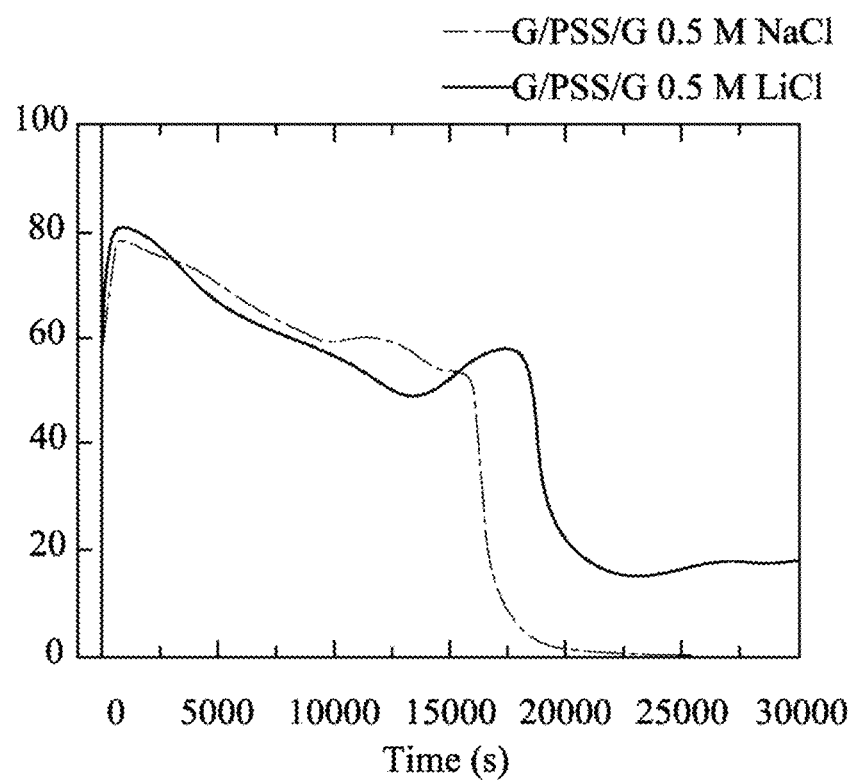
FIG. 11B is a graph showing the change of experiment data of the short-circuit current outputted by a flexible clean energy power generation device when another electrolyte aqueous solution is used in accordance with another preferred embodiment of the present invention

All of the above experiments use pure water solution as the working fluid. To show that other water-based electrolyte solutions can also be used as the working fluid, the team of the present invention studied the impact of different electrolyte solutions on the clean electric energy power generation efficiency of the flexible clean energy power generation device 1, and the G/PSS/G film is selected for the experiment. With reference to FIGS. 11A and 11B for the graphs showing the change of experiment data of the OCV and the SCC outputted by a flexible clean energy power generation device respectively when another electrolyte aqueous solution is used in accordance with another preferred embodiment of the present invention, when the flexible clean energy power generation device 1 uses 0.3 mL of 0.5 M NaCl (simulating the composition and concentration of artificial seawater) and 0.5 M of LiCl, the maximum OCV output of the two are close to 0.8 V, and the SCC output can be increased greatly to 80 µA, which is almost four times of the maximum SCC output of the working fluid (aqueous solution) and has a long-lasting output over 15000 seconds (or 250 minutes). Therefore, it proves that the flexible clean energy power generation device 1 is not limited to the use of deionized pure aqueous solution only, but it can also use artificial seawater (0.5 M NaCl) or other electrolyte solutions as the working fluid. Since the flexible clean energy power generation device 1 has a high concentration of conductive hydrated ions, its power generation efficiency is even higher than that of using deionized pure aqueous solution as a working fluid, and the limitations of use of the working fluid can be reduced significantly.

In summation of the description above, the flexible clean energy power generation device with high power generation efficiency 1 in accordance with the present invention forms a novel structure by the orderly layered conductive material and the polyelectrolyte to achieve the effect of maintaining high voltage, high current, and high power generation efficiency. The polyelectrolyte layer plays an important role of an ion channel to provide a quick movement for water and ions in this channel, and the interior of the polyelectrolyte layer and the interior and exterior of conductive material play the role of conducting electrons in a circuit, stabilizing the ion transport layer, as well as reducing the system flow resistance. Furthermore, the outer-layer conductive material can prevent the water solution in the system from being evaporated too quickly, so as to achieve the long-term power generation function. In summation, the present invention has the following advantages: (1) the present invention is a novel eco-friendly power generation system device, which not only has a better power conversion efficiency than the traditional clean energy devices, but also solves the problem of the low energy conversion efficiency caused by external pressure on traditional devices. The invention only needs a small amount of solution to provide the long-lasting and stable high power output; (2) the present invention does not produce any chemical pollutant in the power generation process, and the device of this invention is a very clean energy generation device, which is beneficial to the sustainable application development of renewable energy; (3) the present invention provides a stable and excellent power generation efficiency under each bending angle, and will have excellent application feasibility on portable and wearable devices in the future; (4) the present invention has a simple structure without requiring any expensive material such as a precious metal, and thus greatly reducing the manufacturing cost; and (5) the limitations of use of the working fluid for the present invention is low, and only a small amount of solution is required to achieve the excellent power generation efficiency, thereby greatly improving the applicable environment and situational range of use.

What is claimed is:

1. A flexible clean energy power generation device with high power generation efficiency, being a multi-film structure, comprising:
    an internal conductive support layer, formed by a hydrophilic substrate coated with conductive material; and
    an ion transport layer, formed by coating a polyelectrolyte on an outer side of the internal conductive support layer;
    thereby, after a solution is dropped on the flexible clean energy power generation device, the solution produces a capillary pressure difference by capillary effect and evaporation phenomena to drive water molecules and counterions of the solution to move from a wet side to a dry side, so as to produce a potential difference.

2. The flexible clean energy power generation device according to claim 1, further comprising an external electron transport layer formed by coating conductive material onto an outer side of the ion transport layer.

3. The flexible clean energy power generation device according to claim 2, wherein the polyelectrolyte is poly(sodium-p-styrenesulfonate) or poly-L-lysine.

4. The flexible clean energy power generation device according to claim 3, wherein when the polyelectrolyte is poly(sodium-p-styrenesulfonate), the ion transport layer is formed by attaching a polyelectrolyte solution onto the internal conductive support layer and then dried, and the weight percentage of poly(sodium-p-styrenesulfonate) in the polyelectrolyte solution is 20~29 wt %.

5. The flexible clean energy power generation device according to claim 2, wherein conductive material is two-dimensional graphene, MXene or zero-dimensional carbon black.

6. The flexible clean energy power generation device according to claim 5, wherein the polyelectrolyte is poly(sodium-p-styrenesulfonate) or poly-L-lysine.

7. The flexible clean energy power generation device according to claim 6, wherein when the polyelectrolyte is poly(sodium-p-styrenesulfonate), the ion transport layer is formed by attaching a polyelectrolyte solution onto the internal conductive support layer and then dried, and the weight percentage of poly(sodium-p-styrenesulfonate) in the polyelectrolyte solution is 20~29 wt %.

8. The flexible clean energy power generation device according to claim 1, wherein conductive material is two-dimensional graphene, MXene or zero-dimensional carbon black.

9. The flexible clean energy power generation device according to claim 8, wherein the polyelectrolyte is poly(sodium-p-styrenesulfonate) or poly-L-lysine.

10. The flexible clean energy power generation device according to claim 1, wherein the polyelectrolyte is poly(sodium-p-styrenesulfonate) or poly-L-lysine.

* * * * *